United States Patent [19]

Alexander

[11] Patent Number: 5,586,356
[45] Date of Patent: Dec. 24, 1996

[54] AUTOMATIC RETURN TO DOCK MECHANISM FOR MECHANICAL DOCK LEVELER

[75] Inventor: James C. Alexander, London, Canada

[73] Assignee: United Dominion Industries, Inc., Charlotte, N.C.

[21] Appl. No.: 563,061

[22] Filed: Nov. 27, 1995

[51] Int. Cl.[6] ........................................ E01D 1/00
[52] U.S. Cl. ................................ 14/71.1; 14/71.3
[58] Field of Search ........................ 14/69.5, 71.1, 14/71.3, 71.7

[56] References Cited

U.S. PATENT DOCUMENTS

| | | | |
|---|---|---|---|
| 3,579,696 | 5/1971 | Hecker, Jr. et al. | 14/71 |
| 4,847,935 | 7/1989 | Alexander et al. | 14/71.3 |
| 4,974,276 | 12/1990 | Alexander | 14/71.3 |
| 5,088,143 | 2/1992 | Alexander | 14/69.5 |
| 5,205,010 | 4/1993 | Hageman | 14/71.7 |
| 5,392,481 | 2/1995 | Hageman | 14/71.1 |
| 5,416,941 | 5/1995 | Hageman | 14/71.7 |
| 5,440,772 | 8/1995 | Springer et al. | 14/69.5 |

Primary Examiner—James A. Lisehora
Attorney, Agent, or Firm—Sughrue, Mion, Zinn, Macpeak & Seas

[57] ABSTRACT

An automatic return to dock mechanism for a dockboard having a frame, a deck pivotally mounted to the frame and a lip pivotally mounted to an outboard end of said deck. The lip has an arm mounted to a lower surface. A crank mechanism comprises a pivoting arm member mounted to the frame and a pushrod extending under the deck having one end thereof coupled to said pivoting arm member and a slot member attached to the other end of the push rod. The slot member engages a portion of said arm mounted to the lip. A spring biases the slot member to urge engagement with the arm mounted to the lip. Aa hold down mechanism that permits the deck to raise and lower includes a linkage to the pivoting arm member. As the lip moves from an extended position to a pendant position, the pushrod is moved in one direction by action of the arm engaged in the slot member causing the pivoting arm member to disengage the hold down allowing said deck to raise. As the lip continues to fall the arm moves in the slot allowing the push rod to move in a second direction thereby allowing the hold down mechanism to re-engage the deck and return to dock level.

6 Claims, 3 Drawing Sheets

AUTOMATIC RETURN TO DOCK MECHANISM FOR MECHANICAL DOCK LEVELER

BACKGROUND OF THE INVENTION

1. Field of the Invention

This invention is related to dock equipment and in particular to dock levelers. It is specifically related to a mechanical device which automatically returns the deck to a horizontal dock position.

2. Prior Art

Dock levelers are used to bridge the gap between a loading dock and a vehicle bed. They typically employ a pivotally mounted deck having a pivoted lip at the distal end. The dock leveler operates in a number of modes, the normal one being where the lip is extended and resting on the bed of the vehicle. When the loading operation is completed it is preferred that the operator return the dock leveler to the stored horizontal position. If the operator does not restore the dock leveler, the lip will fall pendant when the vehicle leaves the dock, and if the tip of the lip is above the top of the lip keepers when the lip falls, the leveler will be supported by the lip resting in the lip keepers. However, if the leveler is not above the horizontal position when the lip falls, the lip will be outside the keepers and a potentially hazardous condition will be created. The dock leveler may appear to be in the horizontal stored position, but if a load is placed on the leveler, it will fall to the lowest position causing the load to be pitched forward into the driveway with serious risk of damage to goods and injury to personnel. It is desirable to return the deck automatically to the horizontal position if the vehicle leaves the dock before the leveler is restored, i.e. automatically returning to the dock position.

However another condition of operation is the so called "below dock end loading" position where the deck is pivoted downward and the lip is in a retracted position. This mode is typically used at the end of a loading sequence or beginning of an unloading sequence where the vehicle is nearly fully loaded and the lip can no longer remain in contact with the bed. The dock leveler must be maintained in this position without activating the automatic return mechanism.

Techniques are known for achieving automatic return to dock position. For example, U.S. Pat. No. 3,579,696 uses the position of the lip to control the raising of the deck assembly from the below dock position. Other dockboard designs having different mechanical implementations are found in U.S. Pat. Nos. 5,205,010; 5,392,481 and 5,416,941. Some of these systems are used in conjunction with hydraulic actuators while others use counterbalance and complex lever mechanisms.

SUMMARY OF INVENTION

It is an object of this invention to provide an automatic return to dock mechanism that is simple in construction, yet reliable and operative over a range of dock operations.

Yet another object of this invention is to provide an automatic return to dock mechanism that uses the position of the lip to control raising the deck from a below dock position to achieve an automatic return to dock operation.

These and other objects of this invention are achieved by means of a spring loaded cam mechanism with a roller mounted therein which is attached to the lip. A push rod is coupled to the cam at one end and to a crank mechanism at the other end. With the lip extended the roller is positioned in a detent of the cam which is biased upward by a spring carried on the deck. When the vehicle pulls away the lip will tend to fall by gravity but is restrained by the roller in engagement with the cam. This causes the push rod to move backward rotating the crank which releases the hold down for the deck. The deck then raises and the lip rotates into a stored position where the lip keepers can support the lip and the deck in the cross-traffic position.

This invention will be described in greater detail by reference to the accompanying drawing and the description of the preferred embodiment that follows.

DESCRIPTION OF THE PREFERRED EMBODIMENT

Figure 1:
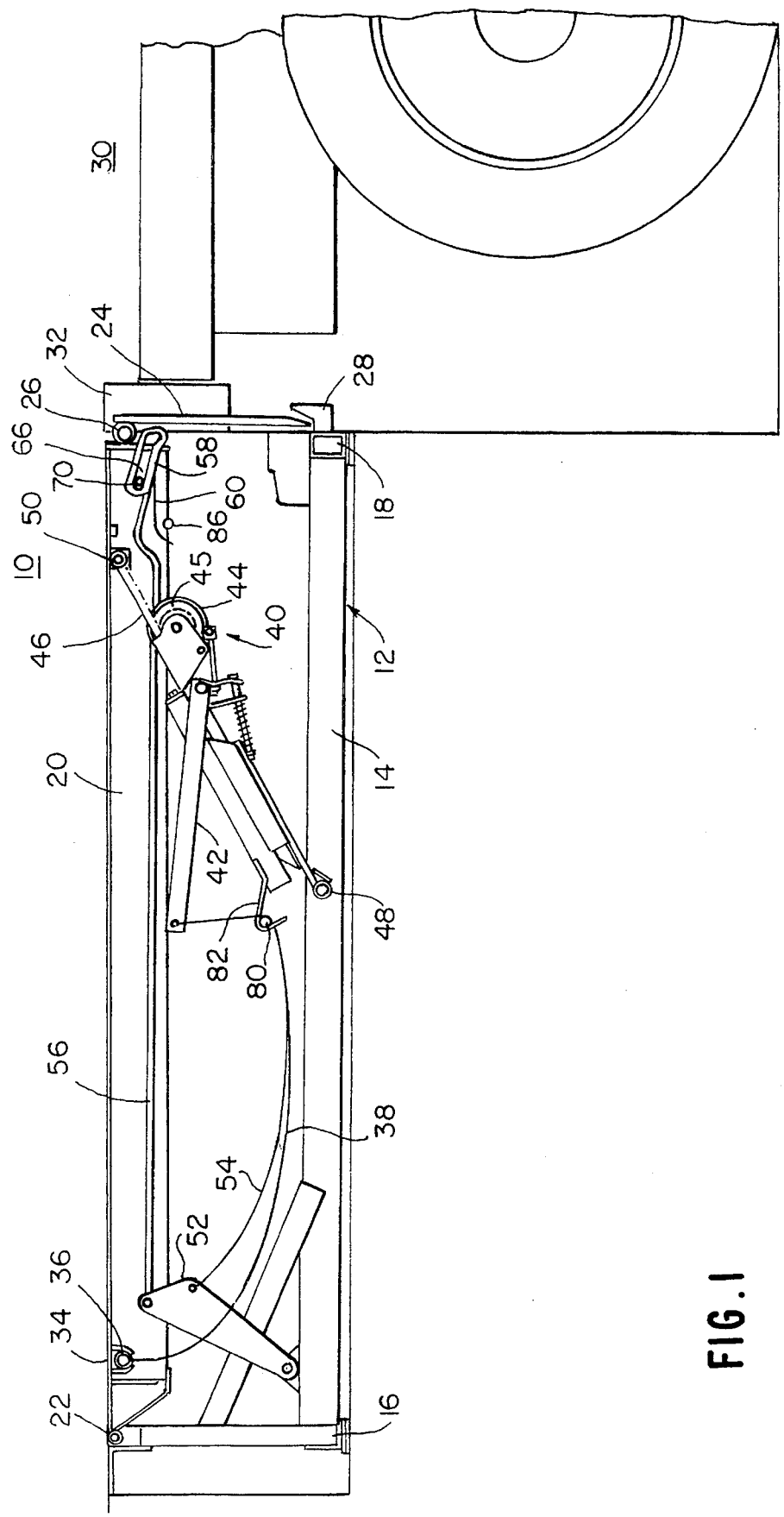
FIG. 1 is a schematic side view of a dock leveler in the stored position illustrating the essential components of this invention.

Referring now to FIG. 1, the essential details of the preferred embodiment of this invention are illustrated. The dock leveler 10 is typically mounted in a pit 12. Frame members 14, 16 and 18 provide the carriage for the deck 20. The deck 20 is pivotally mounted to the frame 16 by a pivot 22. At the distal end of the deck 20, a lip 24 is pivotally mounted by a hinge 26. In the retracted position the lip 24 is retained by lip keepers 28 such that the tip of the lip 24 in contact with the lipkeepers 28 provides a support for the deck 20 to maintain it in a cross-traffic position as illustrated in FIG. 1.

FIG. 1 illustrates in schematic form a vehicle 30 positioned at the dock and in contact with bumpers 32. The deck itself typically has a recess 34 to allow an operator access to a pull ring 36. This ring 36 is connected to a chain or cable 38 which is used to release a hold down mechanism 40. The mechanism is coupled at one end to the frame 14 by a coupling 48 and to the deck 20 by a coupling 50. While illustrated in schematic form and described briefly herein, details of the hold down mechanism may be found in U.S. Pat. Nos. 4,847,935 and 4,974,276 which are expressly incorporated by reference. The purpose of the hold down mechanism is to position the deck in an orientation which allows the lip, when extended, to rest on the vehicle bed as the vehicle changes its vertical position during loading and unloading yet have a degree of stability so that the deck does not bounce as fork lift trucks traverse it.

The hold down mechanism illustrated in FIG. 1 has an actuating lever 42 coupled to a brake mechanism 44, a pinion and one-way clutch mechanism 45 and a rack 46. The one-way clutch mechanism allows the pinion and clutch 45 to turn relative to the brake mechanism 44 when the rack 46 is retracting but prevents the rack from extending unless the brake is released. When the ring 36 is pulled the brake 44 is released, the pinion rotates and the rack extends. As illustrated in FIG. 1 the chain 38 passes over a roller 80 carried by an extension 82 of the hold down mechanism 40. As will be explained and illustrated this is used to tension the chain 38 as a function of crank movement. The deck 20 raises and the rack extends. As the operator "walks the deck down" the rack retracts and the pinion and clutch mechanism 45 rotates as the deck lowers to the operative position. Further details can be found in U.S. Pat. Nos. 4,847,935 and 4,974,276.

Figure 2:
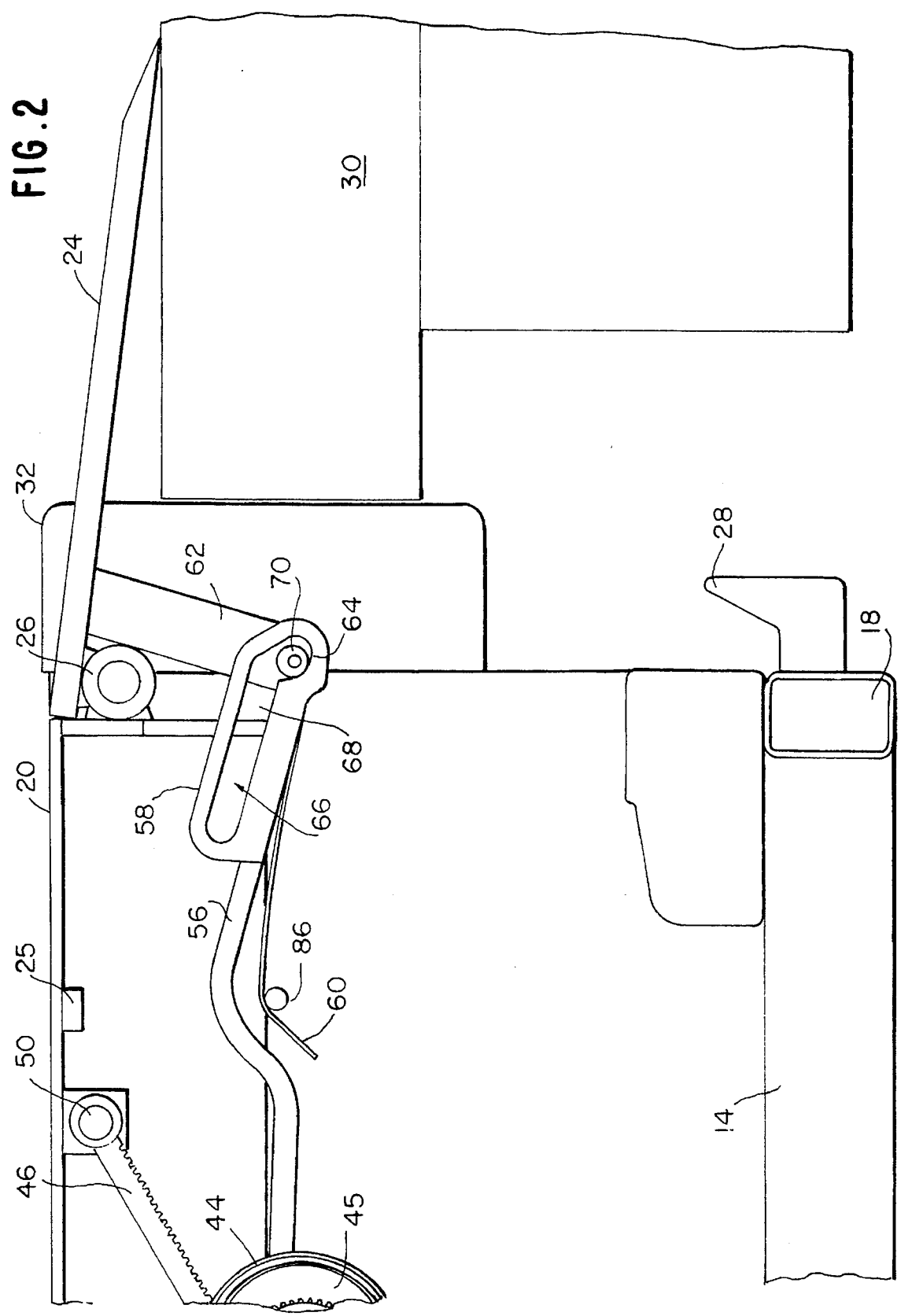
FIG. 2 is a schematic side view illustrating the details of the control mechanism coupled to the lip.

In accordance with this invention, a crank 52 responsive to position of lip 24 is pivotally mounted on the frame 14 and is coupled to the hold down release by a chain or cable 54. A push rod 56 has one end connected to the crank 52 and the other end connected to a slot plate member 58. The plate member 58 carries a spring 60. The lip 24 carries an actuator member 62 having a roller 70 mounted in a slot 68 of the plate member 58. The slot 68 in the plate member 58 has two sections, a generally straight section 66 and a recessed detent As illustrated in FIG. 2, when the lip 24 is extended the roller 70 is positioned in the recessed detent 64. It will be apparent from FIG. 2 that the actuator and plate member do not support the lip, that function carried out by the hinge 26 and contact with the deck of the vehicle 30. The actuator is employed for achieving the automatic return to dock operation which will now be described.

Figure 3:
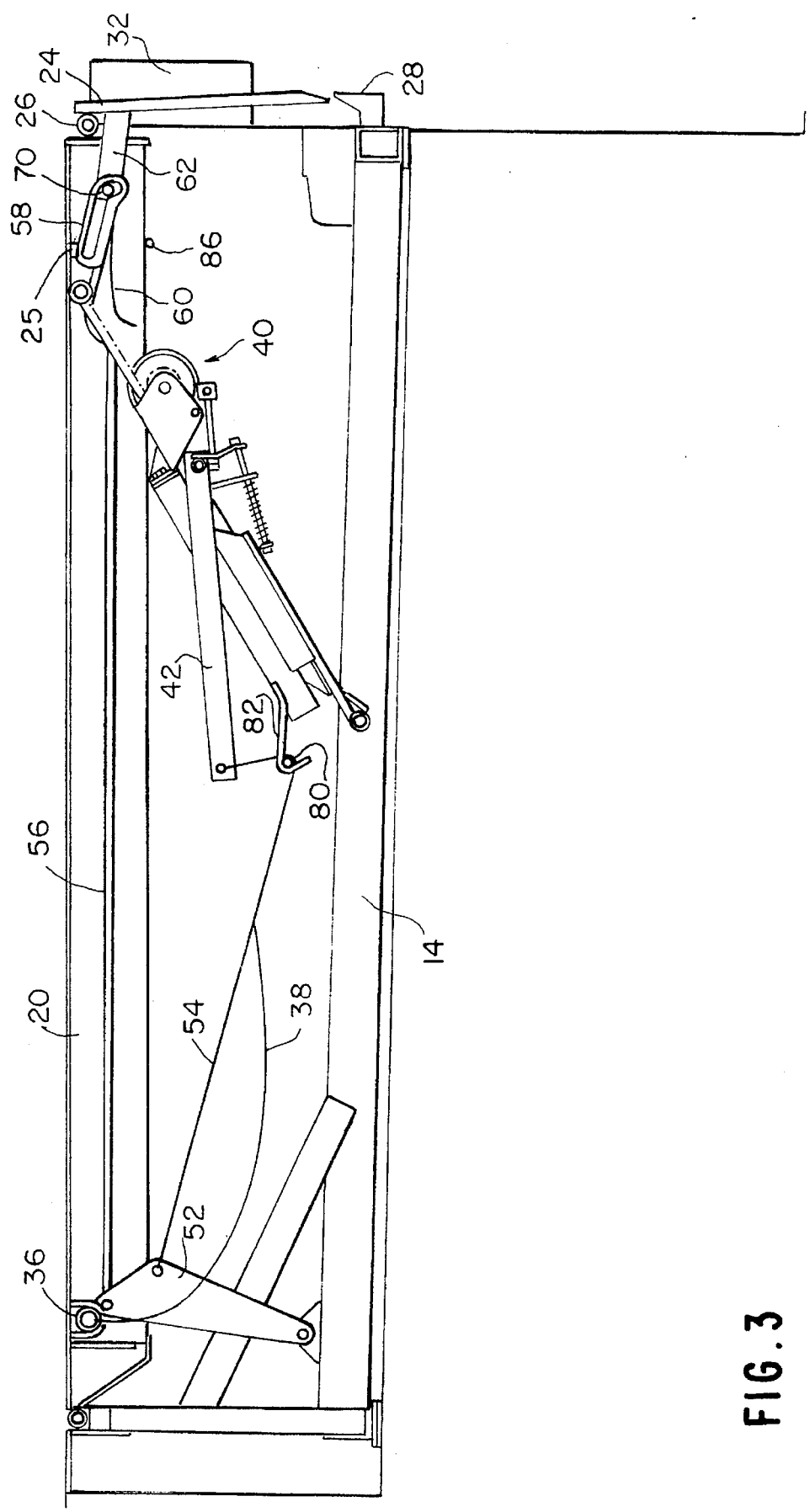
FIG. 3 is a schematic side view illustrating the dock leveler with the lip almost fully retracted with the hold-down mechanism released.

Referring now to FIGS. 1–3 the operation of the mechanism will be described. FIG. 1 illustrates the leveler in the stored position with the lip 24 pendent. The crank 52 is not loaded and thus the pushrod 56 is oriented to have the plate member 58 engage the roller 70 in the straight line portion of the slot 66. When the release 36 is pulled the hold down mechanism 40 is released and the deck begins to raise. The lip 24 is raised in a conventional manner to the extended position. The operator then "walks down" the dock leveler until the lip is resting on the deck of the vehicle 30 as illustrated in FIG. 2.

The spring 60 is attached to the plate member 58 and carried with it. This is illustrated in FIG. 1. A pin 86 is attached to the deck and engages the spring 60 causing it to deflect as the pushrod moves to the right and the lip 24 raises, as illustrated in FIG. 2. This in turn biases the pushrod 56 and plate member 58 upward against the downward force created by the roller 70 in the slot 66 on the plate 58 as the lip rotates upward to an extended position. As the lip 24 extends, the roller 70 moves from the left position in the slot 66 illustrated in FIG. 1 to the position illustrated in FIG. 2. The biasing action of the spring 60 creates an upward force on the plate member 58 to position the detent 64 of the slot behind the roller 70. This locks plate member 58 in position to enable the auto return function of the device to function.

When the dock operation is complete, the vehicle 30, illustrated in FIG. 2 will move away from the dock and the lip will not be supported. As a consequence, the lip will fall by gravity but will be initially restrained by the roller 70 positioned in the detent 64. This forces the push rod 56 to the left which in turn causes the crank 52 to rotate counter-clockwise. As illustrated in FIG. 3 the plate member 58 moves to the left and upward with the roller 70 via action of the lip 24. The rotation of crank 52 tensions the chain 54 which releases the hold down 40 and the deck 20 raises. The lip cannot fall to the totally retracted position shown on FIG. 1 until the tip of the lip has risen above the top of the lip keepers 28. When tip of the lip 24 is above the top of the lip keeper, the lip 24 continues to rotate toward a retracted position. The roller 70 continues to move upward but the plate member 58 is restrained by striking the stop block 25 on the deck 20 and the roller 70 rises about the detent 64. This action permits the plate member 58 to move to the right and the slot 66 to engage the roller 70. This in turn allows the push rod to shift to the right and crank 52 rotates clockwise releasing tension on the chain 54. The holddown then re-engages and the deck stops raising. Although the dock leveler will be positioned slightly above the stored position, a fork truck driving onto the deck 20 will be supported by the lip 24 engaging the lip keepers 28. Another mode of operation of a dock leveler is referred to as "below dock end loading" where the lip is extended slightly to allow the lip to move in front of the lip keepers 28 and then the dock leveler is walked down with the lip pendant between the dock face and the vehicle 30. To maintain this condition the automatic return to dock feature must not release the hold down. As described above, the automatic return to dock mechanism is activated by the lip first being fully extended before falling pendant. When the lip is only partially extended from the stored position, the detent 64 cannot engage the roller 70 so the dock leveler will remain in the below dock end loading position.

It is apparent that modifications of this device can be accomplished within the scope of this invention.

I claim:

1. A dockboard comprising;

a frame, a deck pivotally mounted to said frame, a lip pivotally mounted to an outboard end of said deck;

said lip having an arm mounted to a lower surface, a crank mechanism comprising a pivoting arm member mounted to said frame, a pushrod extending under said deck having one end thereof coupled to said pivoting arm member and a slot member attached to the other end of said push rod, said slot member having a slot engaging a portion of said arm mounted to said lip, a spring to bias said slot member to urge engagement between said slot and said arm mounted to said lip, and a hold down mechanism to permit said deck to raise and lower, said hold down mechanism including a linkage to said pivoting arm member, whereby as said lip moves from an extended position to a pendant position, said pushrod is moved in one direction by action of said arm engaged in said slot causing said pivoting arm member to disengage said hold down mechanism allowing said deck to raise and, as said lip continues to fall said arm moves in said slot allowing said push rod to move in a second direction thereby allowing said hold down mechanism to re-engage said deck and return to dock level.

2. The dockboard of claim 1 further comprising a stop member positioned on the underside of said deck to engage said slot member and prevent movement of said push rod in said second direction, thus allowing said lip to fall to said pendant position.

3. The dockboard of claim 1 wherein said slot member comprises a plate and said slot comprises an elongated slot and a detent at one end of said slot, said elongated slot defining the range of lip rotational movement as said portion of said arm moves in said elongated slot and said detent holding said portion of said arm when said lip is extended.

4. The dockboard of claim 1 wherein said crank mechanism comprises said pivoting arm member pivotally attached to said frame and movable in response to movement of said pushrod, and said linkage tensioned as said pushrod moves in said second direction by rotation of said pivoting arm member to cause said hold down mechanism to re-engage and support said deck.

5. The dockboard of claim 1 wherein said arm mounted to said lip comprises a rigid member attached to said deck and a roller positioned in said slot.

6. The dockboard of claim 1 wherein said spring is attached to said slot member and carried thereby, and means attached to said deck to bias said spring and urge said slot member upward.

\* \* \* \* \*